United States Patent [19]

McCoy

[11] Patent Number: 5,166,996

[45] Date of Patent: Nov. 24, 1992

[54] METHOD OF, AND APPARATUS FOR, PROTECTING AND CURING FIBER OPTIC CABLE TERMINATIONS

[76] Inventor: Bruce M. McCoy, 2305 N. Lexington, Springfield, Mo. 65803

[21] Appl. No.: 706,198

[22] Filed: May 28, 1991

[51] Int. Cl.$^5$ .............................................. G02B 6/26
[52] U.S. Cl. ...................................... 385/84; 385/77; 385/134; 385/139
[58] Field of Search .................... 385/56, 60, 66, 78, 385/77, 84, 134, 139

[56] References Cited

U.S. PATENT DOCUMENTS

| | | | |
|---|---|---|---|
| 4,553,814 | 11/1985 | Bahl et al. | 385/78 |
| 4,747,658 | 5/1988 | Borsuk et al. | 385/78 |
| 4,881,792 | 11/1989 | Alameel et al. | 385/56 |
| 4,896,939 | 1/1990 | O'Brien | 385/56 |
| 5,029,973 | 7/1991 | Rink | 385/60 |
| 5,074,637 | 12/1991 | Rink | 385/56 |
| 5,091,987 | 2/1992 | Mac Culloch et al. | 385/66 |
| 5,101,463 | 3/1992 | Cubukciyan et al. | 385/84 |
| 5,111,520 | 5/1992 | Kawanami et al. | 385/84 X |
| 5,119,456 | 6/1992 | Kawanami et al. | 385/84 X |

*Primary Examiner*—Brian Healy
*Attorney, Agent, or Firm*—Kokjer, Kircher, Bowman & Johnson

[57] ABSTRACT

A fiber protector which cooperates with the applied connector to house and protect the extending length of glass fiber of a fiber optic cable. The protector is a cylinder having a first end coupled to the connector. The protector is elongated to receive the extending length of glass fiber and is sufficiently rigid to protect the extending length of glass fiber from the application of force which could cause cracking or breakage of the glass fiber. Additionally, the protector may be formed of a material having thermal conductivity properties which aid in the thermal curing of the resin within the connector ferrule. Heat is then conducted by the protector to the connector body, and thus to the resin within the ferrule. Furthermore, an apparatus may be provided for connection to the heating end of a standard heat gun, and include means for receiving at least one protector to provide thermal communication between the heat gun and the protector. The heat from the heat gun will thus be applied to the protector, and conducted to the body of the connector and thus the resin.

18 Claims, 2 Drawing Sheets

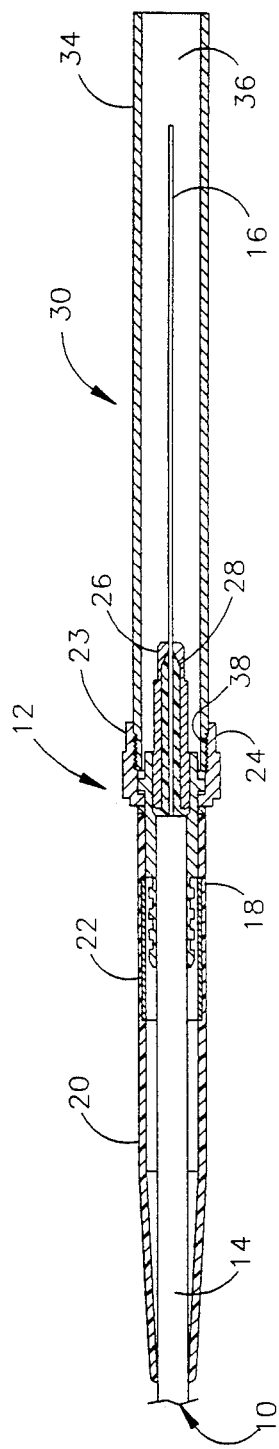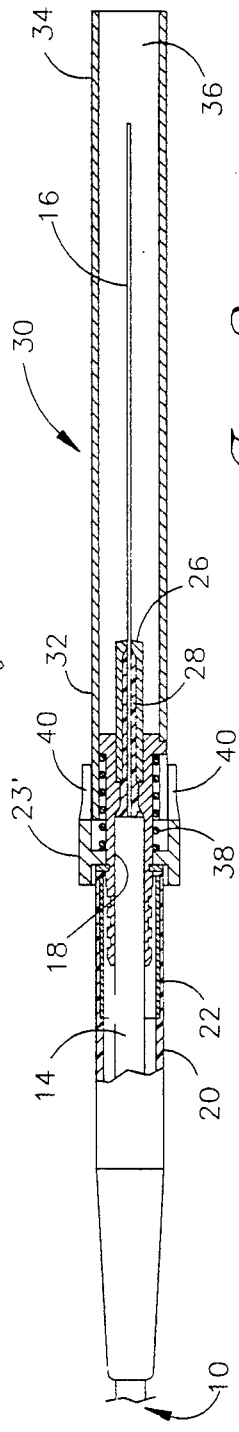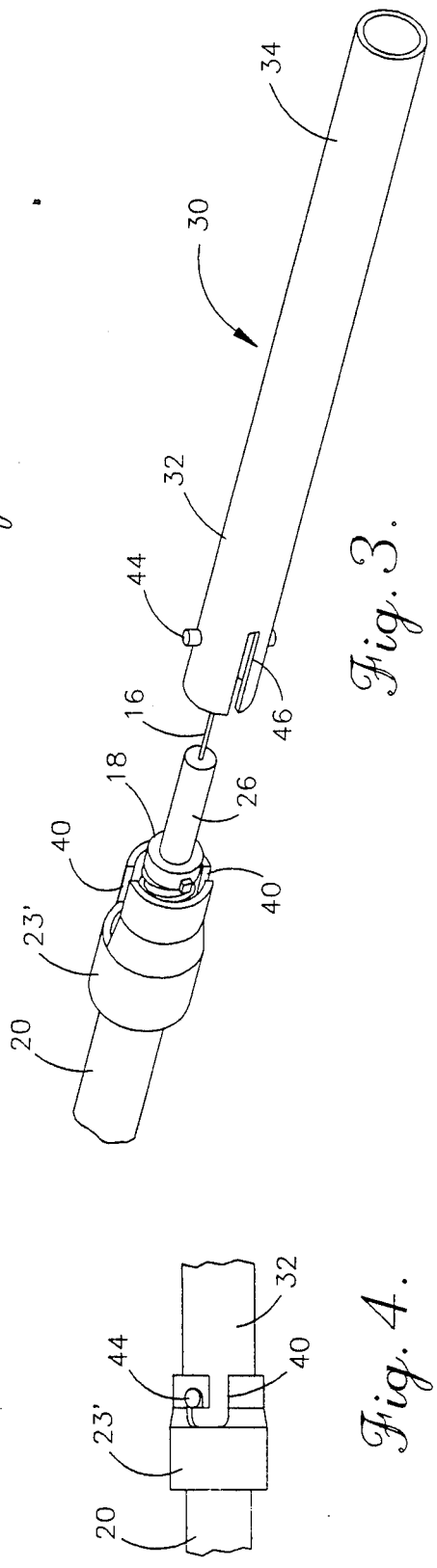

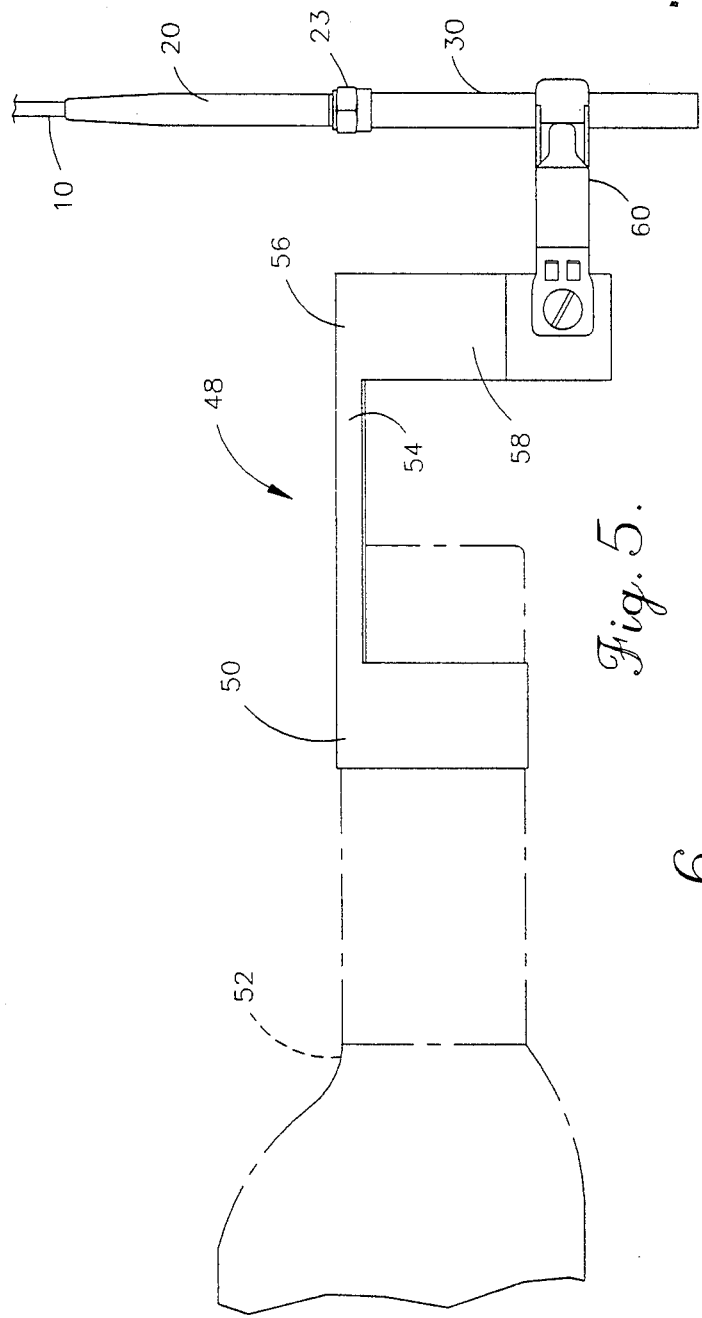
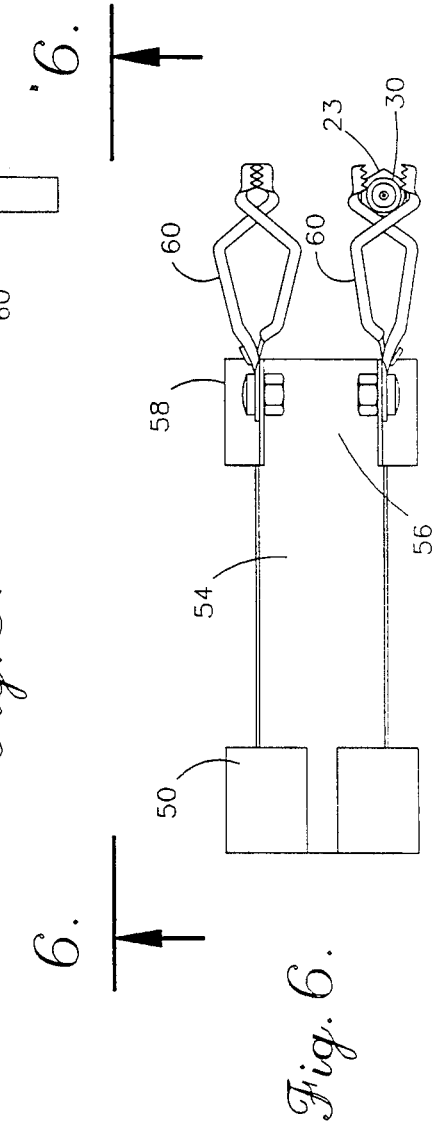

METHOD OF, AND APPARATUS FOR, PROTECTING AND CURING FIBER OPTIC CABLE TERMINATIONS

BACKGROUND OF THE INVENTION

1. Field of the Invention

The present invention relates in general to the termination of fiber optic cables. In particular, the present invention relates to an improved protector for fiber optic cable terminations, a jig for heat curing fiber optic cable terminations, and a method of using same.

2. Description of the Related Art

The use of fiber optic cables for the transmission of signals has increased dramatically in the past few years. Along with this increase, there has been a proportionate increase in the use of connectors which terminate such cable. Unfortunately, current techniques for attaching the connector to the fiber optic cable leave the termination extremely vulnerable to breakage during the process of applying the connector.

In particular, the application of a connector to a fiber optic cable typically begins by the removal of a portion of the protective jacket surrounding the glass fiber of the fiber optic cable such that a length of the glass fiber extends outwardly from the end of the cable. A body and ferrule of a connector is then slid over the free end of the glass fiber to abut against the free end of the protective jacket of the cable, and is crimped in place. The interior of this ferrule typically includes a thermosetting resin to complete the application of the connector to the fiber optic cable.

However, until this resin is cured, the glass fiber is extremely vulnerable to breakage because the free end of the glass fiber extends approximately one to two inches outwardly beyond the ferrule. This length of glass fiber is extremely fragile, and breakage of this fiber typically causes cracks in the length of fiber within the ferrule, causing unacceptable optical signal losses. Additionally, since the connector body has been previously crimped to the fiber optic cable, the connector cannot be recovered, and a new connector must be employed. This is a major cause in connector failures for fiber optic cables, and a significant source of economic losses.

SUMMARY OF THE INVENTION

It is therefore an object of the present invention to provide a protector for a fiber optic cable connector which will protect the extending glass fiber from breakage.

It is a further object of the present invention to provide a method of placing a connector on fiber optic cable which protects this length of glass fiber.

It is a further object of the present invention to provide a protector for the extending length of glass fiber in a fiber optic connector, with the connector being formed to aid the curing of the resin of the connector ferrule.

It is yet another object of the present invention to provide an apparatus for connecting the connector protector to a heat source to aid in the thermal curing of the resin within the connector ferrule.

It is yet a further object of the present invention to provide an improved method of curing the resin within the connector ferrule.

These and other objects are achieved by the provision of a fiber protector which cooperates with the applied connector to house and protect the extending length of glass fiber. The protector takes the general form of a cylinder having a first end which couples to the connector of the fiber optic cable. The protector is elongated and receives the extending length of glass fiber, and has a second end which extends beyond the free end of the glass fiber, such that the glass fiber is received within, and protected by, the protector. The protector is substantially self-supporting and sufficiently rigid to protect the extending length of glass fiber from the application of force which could cause cracking or breakage of the glass fiber.

Additionally, the protector may be formed of a material having thermal conductivity properties which aid in the thermal curing of the resin within the connector ferrule. Advantageously, the protector may be formed of a metal such that external heat is conducted by the protector to the connector body, and thus to the resin within the ferrule. Furthermore, an apparatus may be provided for connection to the heating end of a standard heat gun, and include means for receiving at least one protector to provide thermal communication between the heat gun and the protector. The heat from the heat gun will thus be applied to the protector, and conducted to the body of the connector and thus the resin.

BRIEF DESCRIPTION OF THE DRAWINGS

The objects and features of the invention noted above are explained in more detail with reference to the drawings in which like reference numerals denote like elements, and in which:

FIG. 1 is a cross-sectional view of a first embodiment of a protector according to the present invention applied to a fiber optic connector;

FIG. 2 is a partial cross-sectional view of a second embodiment of a protector according to the present invention applied to a fiber optic connector;

FIG. 3 is a perspective view of the protector of FIG. 2 during application;

FIG. 4 is a detailed view of the applied protector of FIG. 2;

FIG. 5 is a side view of a connector with a protector according to the present invention employed with a heat conducting apparatus according to the present invention; and FIG. 6 is a bottom view of the apparatus and connector with protector of FIG. 5.

DETAILED DESCRIPTION OF THE INVENTION

With reference to FIG. 1, there is shown a typical prior art fiber optic cable 10 having a typical prior art connector 12 applied thereto. The cable 10 includes a protective jacket 14 which has been removed from a length of the free end of the cable 10 to expose a length of glass fiber 16. The connector 12 includes a body 18 which is received over the free end of the jacket 14. A boot 20, formed of a resilient plastic, extends rearwardly from the body 18 of the connector over the jacket 14 of the cable. The boot 20 includes a crimp sleeve 22 of a malleable metal which may be crimped over a rear portion of the body 18 and a portion of the jacket 14 of the cable. The crimp sleeve 22, upon crimping, serves to initially hold the connector 12 in position on the cable 10.

A coupling nut 23 is rotatably mounted on the body 8 of the connector and includes interior threads 24 which will served to couple the connector to the desired device after the connector has been completely applied. The connector also includes a ferrule 26 extending outwardly from the body 18 and receiving the fiber 16. The ferrule defines a cavity therein which houses a mass of resin 28 which bonds the ferrule, connector and fiber to complete the fixation of the connector 12 to the cable 10.

The typical prior art method for applying such a connector would be to first remove the length of protective jacket 14 from the free end of the cable 10 to expose the length of fiber 16. The connector, with nut 23 attached thereto, would then be slid over the length of fiber 16 to be brought into contact with the free end of the jacket 14. The crimp sleeve 22 would then be crimped to initially fix a connector in place. The connector and cable would then be subjected to the necessary conditions to cure the resin 28 within the ferrule 26.

These conditions could include leaving the cable and connector at room temperature for an extended length of time (approximately one to three days) or placing the connector and cable within an oven to subject the cable and connector to an elevated temperature for a shorter period of time (e.g. 150 to 300 degrees Fahrenheit for thirty minutes to several hours). It is during this period prior to curing that the extending length of fiber 16 is most vulnerable.

The protector according to the present invention is generally designated by reference numeral 30. As may be seen, the protector 30 takes the general form of an elongated cylinder having a first end 32 and a second end 34. The first end 3 is associated with means for connecting the protector 30 to the connector 12 such that an interior cavity 36 defined by the protector receives the length of glass fiber 16. The protector 30 is of a sufficient length to fully receive the fiber 16.

Since a major function of the protector 30 is to protect the fiber 16 from the application of forces thereto, the protector 30 is formed of a substantially self-supporting material which is sufficiently rigid to resist an amount of bending which would cause the protector 30 to come into contact with the fiber 16 and apply forces thereto. Along these lines, the means for connecting the protector 30 to the connector 12 must also be sufficiently rigid to prevent such an application of force to the fiber 16. Any sufficiently rigid material, including plastics, ceramics or metals, or a combination thereof, may constitute the protector 30. Similarly, although the cross-sectional configuration of the protector 30 has been described as circular, any cross-sectional configuration may be employed which provides a sufficient cavity 36 such that no forces are applied to the glass fiber 16.

While the means for connecting the protector 30 to the connector 12 may take many forms, it has been found particularly advantageous to form this means to correspond to the particular type of coupling nut 23 employed with the connector 12. In the environment shown in FIG. 1, the nut 23 includes interior threads 24 for coupling the connector to appropriate devices. As such, the first end 32 of the protector 30 includes exterior threads 38 which may mate with the interior threads 24 on the nut 23. After application of the ferrule to the glass fiber 16, the operator need merely slide the protector 30 over the glass fiber 16, taking care not to apply force to the fiber, and engage the threads 38 of the protector with the threads 24 of the nut 23. This will provide a sufficiently rigid connection between the connector and the protector such that the glass fiber 16 remains within the cavity 36 of the protector 30.

A second embodiment of the protector according to the present invention is shown in FIG. 2. In this figure, the elements comprising the connector and the protector are substantially similar to those in FIG. 1, although the nut of the connector takes a different, standard form which necessitates the difference in the connection between the protector and the connector.

Specifically, rather than including a nut 23 having interior threads, the connector of FIG. 2 includes a nut 23' of the standard prior art bayonet variety. The nut 23' is rotatably and slidably mounted upon the body 18 of the connector, with a spring 38 being located between the connector body 18 and nut 23' to urge the nut 23 rearwardly of the connector. As best shown in FIGS. 3 and 4, the nut 23' includes a pair of detent grooves 40, and the connector body 18 includes a pair of connector lugs 42 which cooperate to couple the connector with a desired device, as is well known in the art.

Where the coupling nut takes such a form, the means coupling the protector 30 to the connector may advantageously take the form of a mating device. As such, the first end of the protector 30 will include a pair of projecting lugs 44 extending substantially perpendicular to the longitudinal axis of the protector 30 and sized to mate with the detent grooves 40 in the coupling nut 23'. The protector 30 will also include a pair of receiving grooves which communicate with the first end 32 and are sized to receive the lugs 42 of the connector.

To apply the protector of the second embodiment, the protector 30 is slid over the projecting length of the fiber 16 until the lugs 42 are received within the receiving grooves 46. The nut 23' is then rotated until the opening of the detent grooves 40 correspond to the location of the projecting lugs 44. The nut 23' is then pushed outwardly against the force of spring 38 and thereafter rotated to lock the projecting lugs 44 within the detent grooves 40, as best shown in FIG. 4.

As may be readily envisioned, the protector according to the present invention is an uncomplicated device, yet provides excellent protection against the application of damaging force to the bare fiber 16. However, by forming the protector of the present invention from a material having good thermal conductivity properties, a further advantageous feature of the present protector may be exploited.

Specifically, by forming the protector 30 of a material, such as stainless steel, which provides good thermal conductivity, the protector may be employed as a heat sink to apply heat to the connector and therefore cure the resin 28 within the ferrule 26. As may be readily seen, the application of heat to the protector, when coupled to the connector, will result in heat being transferred along the length of the protector.

A portion of this heat will be transferred to the connector itself through conduction in the means coupling the protector to the connector. Additional heat may be transferred by convection within the cavity 36 of the protector. Such an application of heat to cure the resin totally avoids the need for the use of expensive ovens known in the prior art to cure the resin. Additionally, the curing times may be reduced from that normally encountered with the use of the prior art ovens, and is drastically reduced over the curing time for room temperature curing.

While the heat may be applied to the protector to cure the resin by any well known means in the art (e.g. a length of heat tape wrapped about the protector), a particularly advantageous apparatus for applying this heat is shown in FIGS. 5 and 6, and takes the form of a jig generally designated by reference numeral 48.

The jig 48 includes a first end 50 which is sized to conform to the shape of, and be securely yet slidably received on, the outlet end of a heat gun 52 which expels heated air. The jig 48 includes an extension 54 extending outwardly from the first end 50 and extending between the first end 50 and a second end 56. The first end 50, extension 54 and second end 56 of the jig are preferably formed of a single sheet of stamped and formed metal, such that the elasticity of the metal will provide a secure, yet positionable, fit of the first end 50 on the heat gun 52.

As may best be seen in FIG. 6, the second end 56 of the jig includes a pair of tangs 58. Although two tangs have been shown in the drawings, it should be evident to those skilled in the art that a single or additional tangs could also be provided. Connected to each of the tangs 58 is a clip 60 which is adapted to receive the protector 30. It is advantageous to form these clips for manual activation, as by pressing in the embodiment shown in the drawings.

As is apparent from FIGS. 5 and 6, heat may be applied to the connector by placing the jig 48 on the heat gun 52 and then retaining the protector 30, coupled to the connector, within a clip 60. Upon activation of the heat gun, hot air will be expelled from the end thereof and impinge upon the jig, protector and connector. Heat will therefore be transferred to the protector 30 via convection from the air and by conduction from the jig and clip. This will transfer heat to the connector by convection from the air and through conduction via the protector 30.

This heat will serve to cure the resin of the connector in a dramatically reduced time compared to prior art methods. For example, the connector may be brought to the desired temperature, cured, and cooled all within a five minute time period. This is compared to approximately ten to fifteen minutes simply to bring the connector up to the desired temperature with prior art methods.

The temperature applied to the connector may also be simply varied. By moving the first end 50 of the jig along the length of the nozzle of the heat gun, the protector and connector will be moved closer and further away from the outlet end of the heat gun, to vary the heat applied to the connector. Additionally, retaining the protector within the clip at different points along the protector will vary the heat transferred to the resin. Finally, orienting the protector 30 with its open second end 34 upward will also affect the amount of heat applied to the connector, compared to the downwardly directed second end 34 shown in FIG. 5, as should be readily apparent to those skilled in the art.

Upon completing the desired heat application, the heat gun may be deactivated and the protector 30 retained within the clip 60 until it is sufficiently cooled. Alternatively, the protector 30 may be immediately removed from the clip 60 upon the end of the heating cycle. The protector 30 may then be removed from the connector by disengaging the connector 30 from the nut 23 in a manner corresponding to a typical decoupling of the particular connector.

From the foregoing it will be seen that this invention is one well adapted to attain all ends and objects hereinabove set forth together with the other advantages which are obvious and which are inherent in the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A protector for use with a fiber optic cable at least partially terminated by a connector and having a length of bare fiber extending outwardly from the connector, said protector comprising:
    an elongated, at least substantially self supporting body having a first end and a second end and defining a cavity therethrough adapted to fully receive the length of bare fiber; and
    means associated with said body for substantially rigidly, yet releasably, fixing said first end of said body to the connector with said second end of said body extending outwardly from the connector and the length of bare fiber fully received within said cavity.

2. A protector as in claim 1, wherein said means comprises exterior threads on said first end of said body adapted to operatively engage with interior threads on a coupling nut of the connector.

3. A protector as in claim 2, wherein said body is in the form of a cylinder.

4. A protector as in claim 1, wherein said means comprises a pair of projecting lugs extending radially outwardly from said body adjacent said first end and a pair of receiving grooves communicating with said first end of said body, said lugs and grooves adapted to operatively engage with detent grooves and connector lugs, respectively, on a bayonet coupling nut of the connector.

5. A protector as in claim 4, wherein said body is in the form of a cylinder.

6. A protector as in claim 1, wherein said body is formed of a material allowing thermal conductivity through said body, and further in combination with:
    a jig adapted to be releasably and positionably mounted on a nozzle of a heat gun; and
    at least one clip mounted on said jig and adapted to releasably receive said body of said protector, whereby activation of said heat gun will result in heating of said body of said protector, in turn resulting in the heating of the connector to thermally cure a resin associated with the connector.

7. The combination of claim 6, wherein a plurality of said clips are mounted on said second end of said jig.

8. A protector as in claim 6, wherein said means comprises exterior threads on said first end of said body adapted to operatively engage with interior threads on a coupling nut of the connector.

9. A protector as in claim 6, wherein said means comprises a pair of projecting lugs extending radially outwardly from said body adjacent said first end and a pair of receiving grooves communicating with said first end of said body, said lugs and grooves adapted to operatively engage with detent grooves and connector lugs, respectively, on a bayonet coupling nut of the connector.

10. In a method of terminating a fiber optic cable with a connector such that a length of bare fiber extends outwardly from the connector applied to the cable, the improvement comprising, prior to a final step of said method, the further step of:

substantially rigidly, yet releasably, fixing a first end of an elongated, substantially self supporting body to the connector with a second end of said body extending outwardly from the connector, said body defining a cavity therethrough with the length of bare fiber fully received within said cavity, said body being fixed to the connector by means associated with said body.

11. The method of claim 10, wherein said means comprises exterior threads on said first end of said body adapted to operatively engage with interior threads on a coupling nut of the connector, and said fixing step comprises operatively engaging said exterior threads with the interior threads.

12. The method of claim 10, wherein said means comprises a pair of projecting lugs extending radially outwardly from said body adjacent said first end and a pair of receiving grooves communicating with said first end of said body, said lugs and grooves adapted to operatively engage with detent grooves and connector lugs, respectively, on a bayonet coupling nut of the connector, and said fixing step comprises operatively engaging said associated lugs and grooves.

13. The method of claim 10, wherein said body is formed of a material allowing thermal conductivity through said body, and comprising the further steps of:

releasably retaining said body within a clip mounted on a second end of a jig, said jig including a first end, spaced from said second end, releasably and positionably mounted on a nozzle of a heat gun;

activating the heat gun to thereby heat said body, resulting in the heating of the connector to thermally cure a resin associated with the connector; and deactivating the heat gun after a period of time predetermined to substantially correspond with completion of the thermal curing of the resin.

14. The method of claim 13, wherein said means comprises exterior threads on said first end of said body adapted to operatively engage with interior threads on a coupling nut of the connector, and said fixing step comprises operatively engaging said exterior threads with the interior threads.

15. The method of claim 13, wherein said means comprises a pair of projecting lugs extending radially outwardly from said body adjacent said first end and a pair of receiving grooves communicating with said first end of said body, said lugs and grooves adapted to operatively engage with detent grooves and connector lugs, respectively, on a bayonet coupling nut of the connector, and said fixing step comprises operatively engaging said associated lugs and grooves.

16. A protector as in claim 1, wherein said partial termination is uncured, and further wherein said body is formed of a material allowing thermal conductivity through said body, whereby thermal energy may be conducted through said body to the connector to thereby aid in thermal curing of the termination.

17. A method as in claim 10, wherein the termination is uncured, and wherein said fixing step further comprises said body being formed a a material allowing thermal conductivity through said body, and comprising, subsequent to said fixing step, the further step of:

conducting thermal energy through said body to the connector to therby aid in thermal curing of the termination.

18. A method as in claim 17, comprising, subsequent to said conducting step, the further step of:

removing said body from the connector.

* * * * *